US012564143B2

(12) United States Patent
Chavez

(10) Patent No.: US 12,564,143 B2
(45) Date of Patent: Mar. 3, 2026

(54) TUNNEL STRUCTURE

(71) Applicant: Haygrove Limited, Hereford and Worcester (GB)

(72) Inventor: Oscar Chavez, Hereford and Worcester (GB)

(73) Assignee: Haygrove Limited, Hereford and Worcester (GB)

( * ) Notice: Subject to any disclaimer, the term of this patent is extended or adjusted under 35 U.S.C. 154(b) by 203 days.

(21) Appl. No.: 18/274,032

(22) PCT Filed: Jan. 27, 2022

(86) PCT No.: PCT/GB2022/050212
§ 371 (c)(1),
(2) Date: Jul. 25, 2023

(87) PCT Pub. No.: WO2022/162365
PCT Pub. Date: Aug. 4, 2022

(65) Prior Publication Data
US 2024/0423140 A1    Dec. 26, 2024

(30) Foreign Application Priority Data

Jan. 27, 2021    (GB) ...................................... 2101076

(51) Int. Cl.
*A01G 9/24*        (2006.01)
*A01G 13/24*      (2025.01)
(Continued)

(52) U.S. Cl.
CPC ............. *A01G 9/242* (2013.01); *A01G 9/241* (2013.01); *A01G 13/24* (2025.01); *A01G 13/262* (2025.01); *E04H 15/14* (2013.01); *E04H 15/36* (2013.01)

(58) Field of Classification Search
CPC ........ A01G 9/242; A01G 9/241; A01G 13/24; A01G 13/262; E04H 15/14; E04H 15/36
(Continued)

(56) References Cited

U.S. PATENT DOCUMENTS 963,099 A    *   7/1910   Wells ..................... A01G 13/26
                                                        47/29.5
3,483,879 A  *  12/1969   Oehmsen .............. E04H 15/648
                                                        160/DIG. 7
(Continued)

FOREIGN PATENT DOCUMENTS

CA            2505778 A1     10/2006
CN          202354158 U      8/2012
(Continued)

OTHER PUBLICATIONS

International Search Report and Written Opinion received for PCT Application Serial No. PCT/GB2022/050212, dated May 6, 2022, 13 pages.
(Continued)

*Primary Examiner* — Robert Canfield
(74) *Attorney, Agent, or Firm* — Levenfeld Pearlstein, LLC

(57)                    ABSTRACT

A tunnel structure (10) is described comprising a plurality of cover support members (14) and a cover material (16) supported by and extending over the cover support members (14), the cover support members (14) being of generally arcuate profile and including an upwardly projecting hump (14*c*), the humps (14*c*) of the cover support members (14) being aligned with one another such that the cover material (16) defines a ridge (16*a*) having sides that are more steeply sloped, in use, than the parts of the cover material (16) adjacent the ridge (16*a*).

12 Claims, 3 Drawing Sheets

(51) Int. Cl.
    *A01G 13/26*      (2025.01)
    *E04H 15/14*      (2006.01)
    *E04H 15/36*      (2006.01)

(58) Field of Classification Search
    USPC ........ 47/17, 29.5; 135/93, 94, 124, 160, 906
    See application file for complete search history.

(56) References Cited

U.S. PATENT DOCUMENTS

| | | | | |
|---|---|---|---|---|
| 3,780,477 | A * | 12/1973 | Sprung, Jr. ........... | E04H 15/648 |
| | | | | 52/63 |
| 4,274,234 | A | 6/1981 | Abell | |
| 4,601,136 | A * | 7/1986 | Watanabe ............ | A01G 9/1407 |
| | | | | 52/63 |
| 5,553,551 | A | 9/1996 | Crombie | |
| 6,112,756 | A * | 9/2000 | Tseng ...................... | E04H 15/44 |
| | | | | 135/124 |
| 6,185,877 | B1 * | 2/2001 | Lloyd ...................... | A01G 9/16 |
| | | | | 52/222 |
| 6,367,495 | B1 * | 4/2002 | Powell .................. | E04H 15/644 |
| | | | | 135/124 |
| 6,594,957 | B1 * | 7/2003 | Milburn ............... | A01G 9/1469 |
| | | | | 52/407.3 |
| 7,074,124 | B2 * | 7/2006 | Williams .................. | F24F 7/02 |
| | | | | 47/17 |
| 7,275,555 | B2 * | 10/2007 | Powell .................... | E04H 15/44 |
| | | | | 52/645 |
| 7,958,678 | B2 * | 6/2011 | Ishisaki ............... | A01G 9/1407 |
| | | | | 52/302.1 |
| 8,881,449 | B2 * | 11/2014 | Thery ...................... | A01G 9/14 |
| | | | | 52/302.1 |
| 11,142,906 | B2 * | 10/2021 | Stafford .............. | E04B 1/34384 |
| 11,700,799 | B2 * | 7/2023 | Davison ............... | A01G 9/1407 |
| | | | | 47/29.5 |
| 2013/0239488 | A1 * | 9/2013 | Thery ...................... | A01G 9/14 |
| | | | | 52/86 |
| 2019/0136571 | A1 * | 5/2019 | Whatton .............. | A01G 9/1407 |
| 2021/0267140 | A1 * | 9/2021 | Davison ................. | A01G 13/21 |
| 2022/0095549 | A1 | 3/2022 | Stockum et al. | |

FOREIGN PATENT DOCUMENTS

| | | | | |
|---|---|---|---|---|
| CN | 202819143 U | 3/2013 | | |
| CN | 203087103 U | 7/2013 | | |
| CN | 104380953 A | 3/2015 | | |
| EP | 0 763 322 A1 | 3/1997 | | |
| EP | 1880595 A1 | 1/2008 | | |
| FR | 2949770 A1 | 3/2011 | | |
| GB | 2083519 A * | 3/1982 | ............. | A01G 13/24 |
| GB | 2574838 A | 12/2019 | | |
| IT | 1244951 B | 9/1994 | | |
| JP | 2021073953 A | 5/2021 | | |
| KR | 101377218 B1 | 3/2014 | | |
| WO | 03/077641 A1 | 9/2003 | | |

OTHER PUBLICATIONS

International Preliminary Report on Patentability received for PCT Application Serial No. PCT/GB2022/050212, dated Aug. 10, 2023, 9 pages.
Colombian Search Report dated Jan. 5, 2026, p. 9.
Michigan Greenhouse Company catalog, 2021, Marquette, Michigan, USA, 48 pages.

\* cited by examiner

TUNNEL STRUCTURE

CROSS-REFERENCE TO RELATED APPLICATION DATA

This application is a 35 U.S.C. 371 U.S. national stage filing of International Application No. PCT/GB2022/050212, having an international filing date of 27 Jan. 2022, which claims the benefit of and priority to Great Britain Application GB 2101076.4, having a filing date of 27 Jan. 2021, the disclosure of which is incorporated herein in its entirety.

This invention relates to a tunnel structure, for example for use as a polytunnel for the cultivation of crops. In particular, it relates to a tunnel structure in which ventilation of the interior of the tunnel structure can be enhanced.

One form of tunnel structure in common use takes the form of a series of arcuate cover support hoops supported by respective legs, the cover support hoops together carrying a flexible sheet material cover, for example of polythene or the like. The shapes of the cover support hoops are such that the cover defines a tunnel roof of, for example, part cylindrical profile or the like. In use, the tunnel structure defines an interior void in which crops can be grown in a controlled environment.

It is desirable, in the tunnel structure of the type described hereinbefore, to be able to roll up at least some of the cover material at times to increase ventilation to the interior of the tunnel structure. In this manner, the temperature and humidity within the tunnel structure can be controlled, at least to a degree, thereby allowing optimisation of the crop growing conditions.

Usually, the cover material is secured in position upon the cover support hoops by ropes or straps that pass over tunnel structure and are anchored to anchor points, typically defined by parts attached to the legs. In such an arrangement, rolling up of the cover to increase ventilation is hampered by the presence of the ropes or straps, the tension in the ropes or straps preventing or restricting movement of a roll of cover material. In particular, movement of a roll of cover material at or close to the top most part of the tunnel structure is severely impeded and as a consequence, the maximum level of ventilation possible with such a tunnel structure is fairly limited, and may be too limited or restricted for use in some locations or with certain crops.

Arrangements are known which allow the tension in the ropes or straps to be reduced, thereby allowing movement of a roll of cover material to a position close to the top most part of the tunnel structure and so permitting increased levels of ventilation. Whilst such arrangements allow increased ventilation to be achieved, one disadvantage with such arrangements is that there is a tendency for rainwater to collect upon the remaining, not rolled up section of the cover material at the top of the tunnel. The need to release the tension in the anchor ropes or straps further adds to the complexity of the task of adjusting the level of ventilation. The collected rainwater tends to collect at locations between adjacent ones of the cover support hoops, causing ballooning of the cover material and snaking of the tube upon which the cover material is wound. The collected water can thus cause damage to cover material, and the additional weight of the collected water may apply additional loadings to the tunnel structure that, potentially, could cause damage thereto. To avoid such rainwater collection, it is known to use a further section of cover material to wrap around and over the rolled up cover material. However, installation of such a further section of material is inconvenient and time consuming, and so is undesirable.

It is an object of the invention to provide a tunnel structure in which at least some of the disadvantages associated with known arrangements are overcome or are of reduced impact.

According to the present invention there is provided a tunnel structure comprising a plurality of cover support members and a cover material supported by and extending over the cover support members, the cover support members being of generally arcuate profile and including an upwardly projecting hump, the humps of the cover support members being aligned with one another such that the cover material defines a ridge having sides that are more steeply sloped, in use, than the parts of the cover material adjacent the ridge.

Such an arrangement is advantageous in that if the cover material is rolled up to a position adjacent the humps formed in the cover support members, most rainwater impinging upon the cover material will tend to flow therefrom rather than collect upon the cover material to form balloons or the like. A small amount may collect between the rolled up cover material and the cover material defining the ridge, but this amount is insufficient to cause significant damage. Ballooning of the cover material and snaking of a tube upon which the cover material is wound may thus be avoided or reduced to a lower level.

As such, the cover material may be deployed as an, in use, uppermost cover material, exposed to weather and rain. The cover material may be used as the only cover, avoiding the need for double skin structures that might otherwise be used to mitigate water pooling.

The cover support members are preferably of tubular material form, bent to take on the desired shape with the humps being defined by appropriate bends in the cover support members.

Preferably, the cover material is anchored in position by anchor ropes or straps extending over the cover material. In such an arrangement, the presence of the ridge results in the anchor ropes or straps being spaced apart from the cover material, at least in places, resulting in the ease with which the cover material can be rolled up or unrolled to adjust ventilation being enhanced without requiring release of the tension in the anchor ropes or straps.

In embodiments, the cover material is anchored in position at an, in use, upper end of the cover support members. The cover material may be anchored via a sheet-retaining structure located at an, in use, upper end of the cover support members. The cover material may be anchored to the upwardly projecting hump.

An upper surface of the ridge may be provided, in addition to the anchor ropes or straps, with a sheet-retaining structure, the sheet-retaining structure being able to engage a portion of the sheet, to assist with the anchoring to the upper surface of the ridge. This reduces the reliance on the anchor ropes or straps as anchoring means, or sole anchoring means, on the upper end of the tunnel structure.

The sheet-retaining structure may be provided in the form of an elongate track comprising an elongate insert. Such an elongate track can be dimensioned to receive a fold or bow of a sheet that is then affixed into the elongate track via the elongate insert. By way of example, the elongate track may be provided in the form of a C-shaped profile, or a U-shaped profile with inbound free ends. The elongate insert may be provided by a wave-shaped rod or undulated wire that can be rotated or squeezed, for insertion into the elongate track. In such an arrangement, conveniently, the elongate insert may be inserted laterally via the open side of the C-shaped profile, avoiding a need to feed an elongate insert axially from an end into the profile.

A wave-shaped rod or undulated wire may be designed with an appropriate strength and flexibility, such that it may be resiliently deformed or rotated for insertion and, once inserted into the elongate track, it may relax or splay to an expanded form in which it resists removal from the elongate track, thereby clamping a length of material into the elongate track. The arrangement allows a length of sheet to be retained with relatively homogeneously distributed force by a structure extending across a plurality of cover support members, without requiring holes or pockets in the sheet. For practical purposes, the elongate track and the elongate insert may be provided as multiple parts suitable for handling, for instance, as a series of elements of about 1 to 1.5 metres length.

Another form of sheet-retaining structure may be provided by an arrangement comprising and elongate pole and a plurality of clips that can be clamped onto the pole. Cover material can be affixed to the pole by clamping it between the clips and the pole.

As such, it will be appreciated that several attachment mechanisms may be used to provide a sheet-retaining structure in addition to the anchor ropes or straps, including hoops, buttons, ties etc. Furthermore, the sheet need not necessarily be unitary across the full width of the tunnel. For instance, two separate sheets, one for each side of the tunnel structure, may be anchored to the upper surface.

The upper surface may be constituted by a top edge of the ridge, however this is not necessarily the case in all embodiments. For instance, the upper surface may be off-centre. By being anchored via a sheet-retaining structure to the upper surface of the ridge, the side portions of the sheet may be rolled up or unwound more easily with a greater degree of independence from their respective opposite side portions, reducing a likelihood of slippage or dislocating of the cover material that may otherwise occur when anchor ropes or straps as the main anchoring means are relatively loose.

The cover support hoops could be of one piece form. However, they are preferably of three piece form with the humps being formed separately from the remainder of the cover support hoops. The humps may be fabricated from the material of increased wall thickness. The pieces of the cover support hoops are conveniently welded or otherwise secured to one another.

The invention will further be described, by way of example, with reference to the accompanying drawings, in which.

Figure 1:
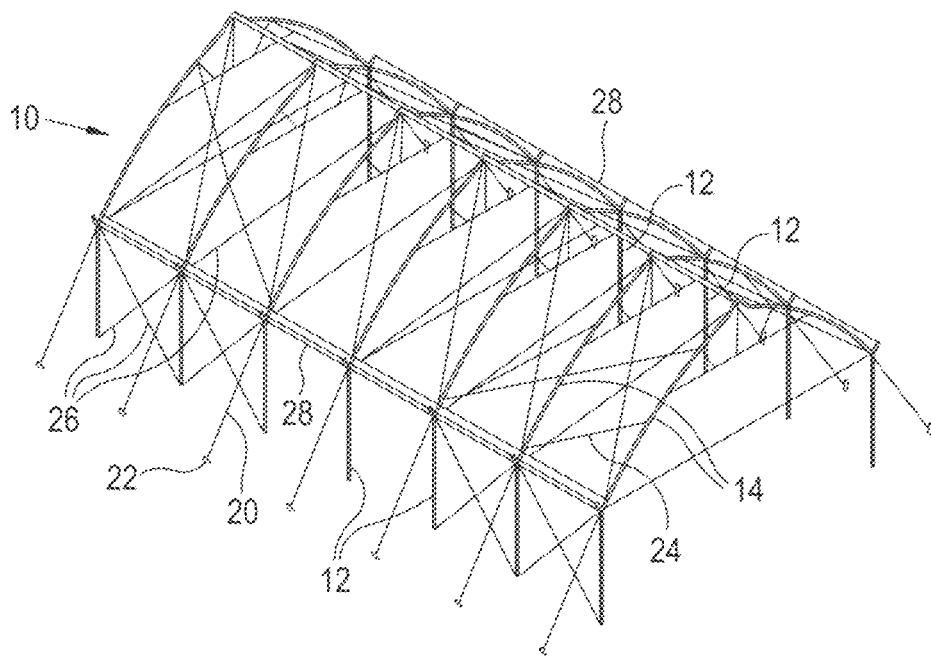
FIG. 1 is a diagrammatic perspective view of a tunnel structure in accordance with an embodiment of the invention.

Referring to the accompanying drawings, a tunnel structure 10 is illustrated, intended for use as a polytunnel for the cultivation of crops. The tunnel structure 10 comprises a pair of rows of legs 12, each of which is anchored in an upstanding configuration to the ground. Each leg 12 of one of the rows is interconnected with a corresponding leg 12 of the other of the rows by a respective cover support member 14.

A cover member 16 (see FIG. 2) in the form of a flexible sheet of polythene or the like extends over the cover support members 14 to define a roof of the tunnel structure 10. The cover member 16 may be secured in position by a series of anchor ropes or straps 18 which extend over the cover member 16 and which are anchored to anchor points associated with the legs 12. As will be set out in more detail below, the tunnel structure 10 may be set up such that anchor ropes or straps 18 are relied on mainly for securing the cover member 16 laterally, at the legs 12.

Anchor cables 20 extend between the upper parts of the legs 12 and ground anchor points 22 to enhance stability, and reinforcing struts 24 and cables 26 may be provided, as required, to enhance the rigidity of the structure 10.

As illustrated, gutters 28 may be carried by the upper ends of the legs 12 to collect and carry away rainwater draining from the cover member 16, for example for collection and use for irrigation purposes.

Whilst the drawings illustrate a single tunnel structure 10, it will be appreciated that two or more such structures may be provided in a side-by-side arrangement, in which case certain of the rows of legs 12 may serve to support the cover support members 14 of two adjacent ones of the structures 10.

In accordance with the invention, each cover support member 14 is shaped to include a pair of arcuate sections 14a, 14b and a central humped section 14c located between the two arcuate sections 14a, 14b. The shapes of the cover support members 14 are such that the cover member 16, extending over and supported by the cover support members 14 defines a ridge 16a, the sides of which are of a greater steepness than the parts of the cover member 16 supported by the adjacent parts of the arcuate sections 14a, 14b. Being of greater steepness, (see FIG. 2) the sides are inclined in the same direction as their respective arcuate section, towards the centre of the cover support member. The greater steepness is thus provided without an overhang away from the centre line of the cover support member. The ridge formation helps to reduce sagging of the cover member 16 between spaced-apart cover support members 14, and thereby helps to avoid a plateau structure in which water may otherwise collect.

The edge parts of the cover member 16 are secured to respective tube members 30 such that rotation of the tube members 30, starting from a position in which the cover member 16 extends over substantially the entire tunnel structure 10, causes the cover member 16 to become wound upon to the tube members 30, and for the tube members 30 to ride over the cover support members 14 towards the ridge 16a. It will be appreciated that once the tube members 30 (and the cover member 16 wound thereon) are located adjacent the ridge 16a, the vast majority of the tunnel structure 10 is no longer covered by the cover member 16, and so a high degree of ventilation is provided. As shown (see FIG. 2), the wound-up cover member 16 includes a portion covering the ridge 16a that is not wound up and that is retained on the ridge 16a.

Figure 2:
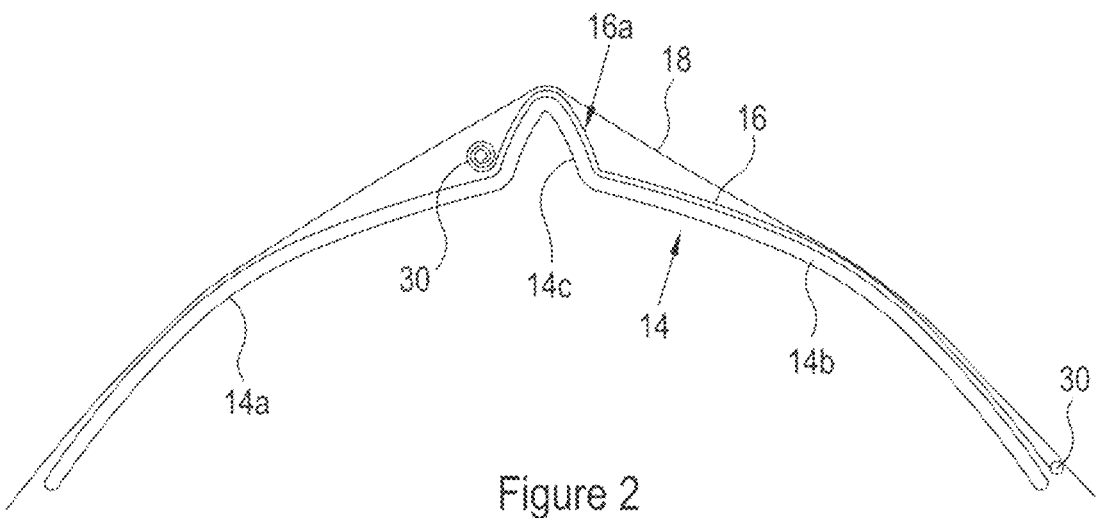
FIG. 2 is a diagrammatic view illustrating part of the tunnel structure of FIG. 1.

The right hand side of FIG. 2 illustrates the cover member 16 in an unrolled, low ventilation condition, and the left hand side of FIG. 2 shows the cover member 16 rolled up upon tube member 30, in a maximum ventilation position. The tube members 30 can occupy any intermediate position between these two extremes, thus permitting intermediate levels of ventilation to be achieved.

The anchor ropes or straps 18 extend over the ridge 16*a*, and as a consequence the anchor ropes or straps 18 are spaced apart from the cover member 16 or only relatively lightly engage the cover member 16 over a large part of the tunnel structure 10. Consequently, the presence of the anchor ropes or straps 18 does not significantly impede the operation of rolling up, or unrolling, the cover member 16 and so adjustment of ventilation may be undertaken without need to adjust the tension in the anchor ropes or straps 18. The operation of adjusting the degree of ventilation is thus significantly simplified.

As will be appreciated from a study of FIG. 2, as the anchor ropes or straps 18 are tensioned from an upper end of the ridge 16*a*, they avoid pressing the cover member 16 against portions of the sections 14*a*, 14*b* that are proximate to the ridge 16*a*, i.e they avoid proximity with inner (and therefore higher) portions of the arcuate sections 14*a*, 14*b* due to the steepness of the side portions of the humped section 14*c*. In contrast, the anchor ropes or straps 18 are relatively close to portions of the sections 14*a*, 14*b* that are distal to the ridge 16*a*, whereby they assist with retaining the cover member 16 at the laterally outer (and therefore lower) portions of the arcuate sections 14*a*, 14*b* near the legs 12.

By way of the arrangement, the anchor ropes or straps are more likely to come into contact with a sheet member on the laterally outward sides of the tunnel structure 10, distally of the upwardly projecting hump, to assist with the retention of lower ends of a sheet in an unrolled configuration. Likewise, the anchor ropes or straps are less likely to come into contact with a sheet at the upper region of the tunnel structure 10, proximally to the upwardly projecting hump, therefore reducing interference with the rolling up of the sheet. This allows a single cover material sheet to be used on either side of the ridge 16*a*, which avoids the need for multiple windows, and by extension, avoids the need for multiple window actuation configurations, for the cover member 16.

The arrangement is a contrast to an earlier arrangement disclosed in United Kingdom Patent Publication GB2574838A by the Applicant. In GB2574838A, in order to roll up sheets fully, to the top, it is necessary to loosen the anchor ropes or straps at the top of the tunnel structure. In the present disclosure it is suggested, in contrast to GB2574838A, to allow the anchor ropes or straps to remain taut at the top. To this end, the present disclosure provides a humped section providing an narrow contact line by way of steeply sloped sides, to allow the sheets to be rolled up to a position near the top, without requiring an adjustment of the tension of the anchor ropes or straps.

Importantly, when the tube members 30 (and the cover member 16 wound thereon) are located adjacent the ridge 16*a* as is the case when the degree of ventilation is maximised, the majority of rainwater impinging upon the cover member 16 will tend to drain from the cover member 16, there only being a very small area or volume in which rainwater can collect. Consequently, by providing the upwardly projecting hump in the form of a ridge, the risk of collected rainwater causing ballooning of the cover member 16 is reduced, and so damage to the cover member 16 resulting from such ballooning is reduced. Furthermore, as the weight of water collecting upon the cover member 16 is reduced, the tendency for the tube members 30 to sag between the adjacent cover support members 14 and so to become of snaked form, and the risk of other weight related damage to the support structure 10, is also reduced.

The reduction in the area or volume in which rainwater is able to collect arises from the fact that the tube members 30 can be moved to positions immediately adjacent the ridge 16*a*, in turn arising in part from the fact that the anchor ropes or straps 18 are located so that such movement is not impeded, and the fact that the sides of the ridge 16*a* are relatively steep and that the tube members 30 can be positioned so as to abut the steep sides of the ridge 16*a*, in use. Without the relatively steep sided ridge, a greater area or volume would be present in which rainwater can collect, leading to the disadvantages associated with known arrangements.

In the arrangement shown, the sides of the ridge 16*a* are angled to the vertical by an angle of less than 45 degrees, preferably in the region of 30 degrees. The included angle α between the outer surface of the ridge 16*a* and the extension of the portion of the adjacent cover support member 14*a* may be larger than 90 degrees, or larger than 100 degrees, to provide a continuous run-off slope, with a more steeply sloped portion at the upper region, avoiding an overhang.

Each cover support member 14 is conveniently of three piece construction, with the arcuate sections 14*a*, 14*b* being of a thinner walled tubular material, conveniently of oval or the like section, that the humped section 14*c*, such an arrangement being advantageous in that the thicker walled, and hence stronger, material is used in the locations at which the cover support member 14 needs to be of greatest strength. The three pieces are conveniently welded to one another. However, whilst this represents one suitable fabrication technique, the invention is not restricted in this regard and could be of, for example, one piece form.

Whilst conveniently the humped sections may be formed as described hereinbefore, they could alternatively be defined by separate hump components that are located upon and carried by otherwise arcuate cover support hoop members, to cause the cover member to define the aforementioned ridge.

Figure 3:
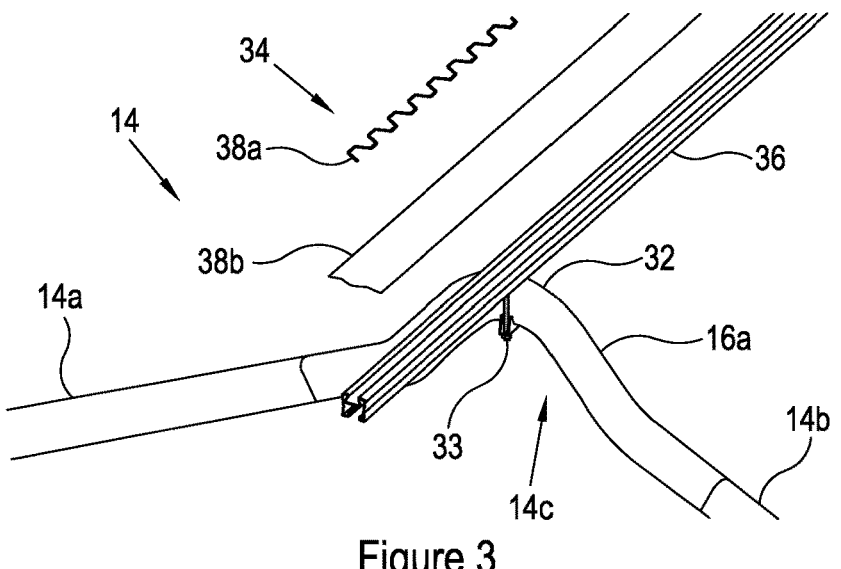
FIG. 3 is an exploded view of part of a sheet-retaining arrangement.
Figure 4:
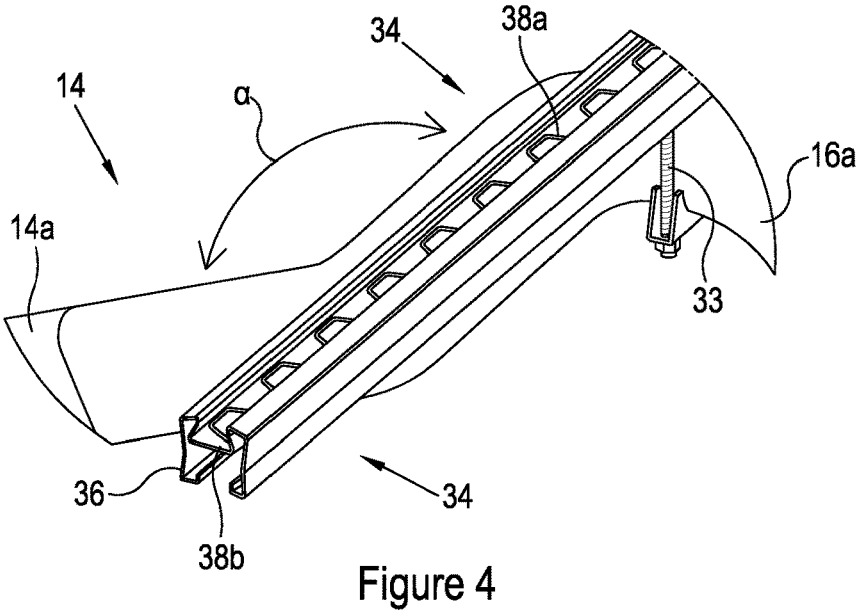
FIG. 4 shows an assembly corresponding to FIG. 3.
Figure 5:
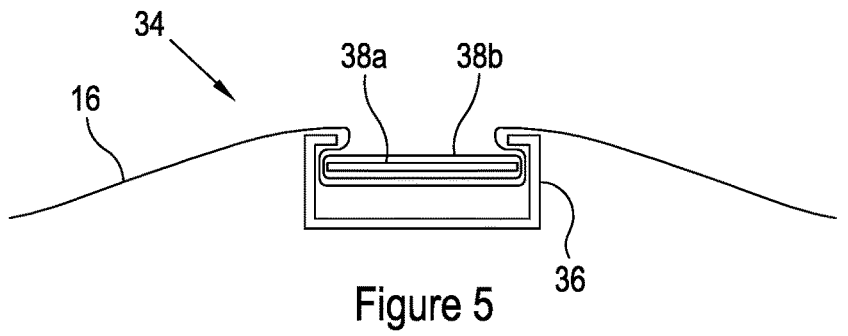
FIG. 5 illustrates, schematically, a sheet-retaining arrangement corresponding to FIGS. 3 and 4.

FIGS. 3 to 5 show an upper end portion of a cover support member 14. To simplify the description, the same reference numerals are used in FIGS. 3 and 4 as in FIGS. 1 and 2 for like components. The upper end 32 of the ridge 16*a* is provided with a sheet-retaining structure 34. The sheet retaining structure 34 comprises a support profile 36 providing an elongate channel into which an undulated wire 38*a* constituting an elongate insert may be inserted. The support profile 36 is affixed to the upper end 32 of the ridge structure by way of a bracket assembly 33, and it will be appreciated that a number of bracket assemblies 33 are used to mount a support profile 36 to a series of support members 14 of a tunnel structure. The sheet-retaining structure 34 comprises a sheath structure 38*b* such as tape at least partially enveloping the elongate structure, to reduce isolated pressure points on the cover member 16. The sheath structure 38*b* may be omitted in some embodiments.

FIG. 5 shows a section illustrating, schematically, how a single cover member 16 in the form of a sheet may be retained in a channel 36, by being clamped into the groove of the channel 36 via the elongate insert constituted by an undulated wire 38*a*. The undulated wire 38*a* is resiliently engaged in the channel 36 and thereby retains the sheet 16 in place, locating it at the upper end of the ridge 16*a* (ridge 16*a* not shown in FIG. 5) and thereby reducing reliance on anchor ropes or straps to hold down the cover member 16.

Figure 6:
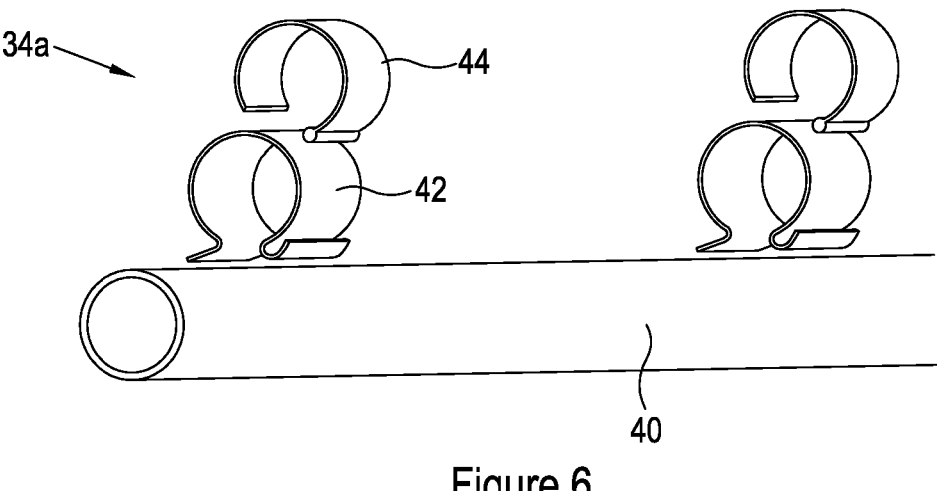
FIG. 6 illustrates, schematically, another sheet-retaining arrangement.
Figure 7:
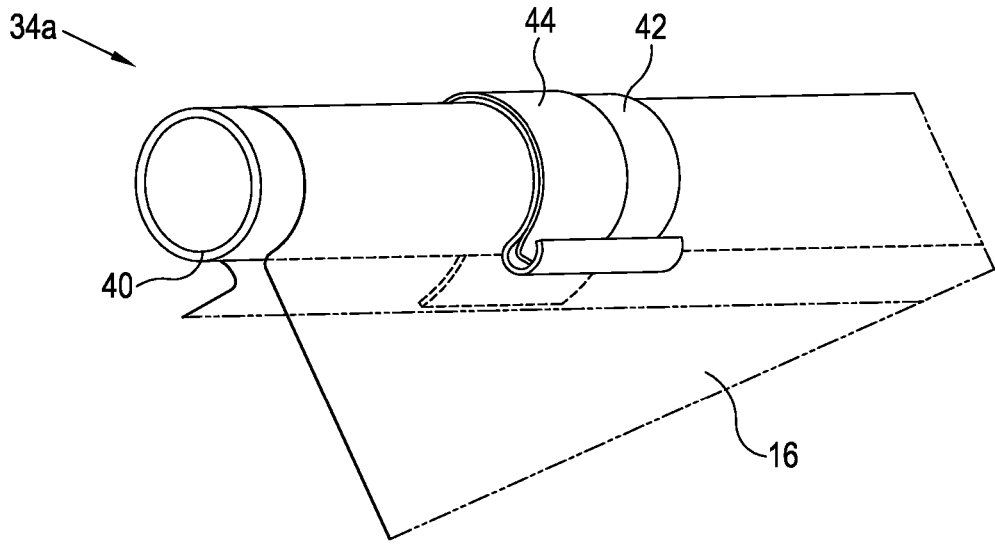
FIG. 7 illustrates the arrangement of the type of FIG. 6 in assembled form.

FIGS. 6 and 7 show another form of sheet retaining structure 34*a* comprising a pole 40 and a series of clip arrangements 42, 44. The pole 40 may be mounted across a series of spaced apart cover support members 14 in the manner of the support profile 36 described above. For instance, the pole may be mounted to the cover support members 14 using a bracket arrangement such as the bracket assembly 33. The sheet retaining structure 34*a* comprises a number of retainer clips 42 and reinforcing cuffs 44. The retainer clips 42 of general "C" shape or "Q" shape that are resiliently attachable to the pole 40. The reinforcing cuffs 44 may be clamped onto the retainer clips 42 to reduce the likelihood of the retainer clips 42 resiliently detaching under load such as strong wind. As will be appreciated, a cover member 16 (of which only a portion is depicted in FIG. 7) may be affixed by clamping it between the retainer clips 42 and the pole 40. A series of such retainer clips and cuffs, spaced apart e.g. about 30 to 50 centimeters, may suffice to retain the cover member 16 anchored at an upper end of the cover support members 14.

It will be appreciated that whilst specific embodiments of the invention are described hereinbefore in conjunction with the accompanying drawings, a wide range of modifications and alterations may be made without departing from the scope of the invention as defined by the appended claims.

The invention claimed is:

1. A tunnel structure comprising a plurality of cover support members and a cover member supported by and extending over the cover support members, the cover support members being of generally arcuate profile and each including an upwardly projecting hump, the humps of the cover support members being aligned with one another, and wherein the cover member is anchored in position by a sheet-retaining structure on the upwardly projecting humps, to permit rolling up, such that upon rolling up of the cover member to a rolled up maximum ventilation position adjacent the humps, a portion of the cover member that is not wound up covers the humps, such that the cover member defines a ridge having sides that are more steeply sloped, in use, than the parts of the cover member when in an unrolled condition adjacent the ridge.

2. The structure according to claim 1, wherein the cover support members are bent to take on the desired shape with the humps being defined by appropriate bends in the cover support members.

3. The structure according to claim 1, wherein the cover member is anchored in position by anchor ropes or straps extending over the cover member.

4. The structure according to claim 1, wherein the cover member is anchored to the upwardly projecting hump.

5. The structure according to claim 1, wherein the cover support members are of one piece form.

6. The structure according to claim 1, wherein the cover support members are of three piece form with the humps being formed separately from the parts defining the remainder of the cover support members and subsequently secured to the parts defining the remainder of the cover support members.

7. The structure according to claim 6, wherein the pieces of the cover support members are welded or otherwise secured to one another.

8. The structure according to claim 1, wherein the sides of the ridge are angled to the vertical by an angle of less than 45 degrees.

9. The structure according to claim 8, wherein the sides of the ridge are angled to the vertical by an angle of around 30 degrees.

10. The structure according to claim 1, wherein the cover member takes the form of a flexible sheet of polythene.

11. The structure according to claim 1, wherein the sheet-retaining structure comprises an elongate channel into which an elongate insert may be inserted.

12. The structure according to claim 1, wherein the sheet-retaining structure comprises a pole and a series of clip arrangements.

* * * * *